INVENTORS
ERICK O. SCHONSTEDT
HENRY R. IRONS

Feb. 14, 1956   E. O. SCHONSTEDT ET AL   2,735,063
TOTAL FIELD MAGNETOMETER
Filed Aug. 6, 1952   8 Sheets-Sheet 2

INVENTORS
ERICK O. SCHONSTEDT
HENRY R. IRONS

BY

ATTORNEYS

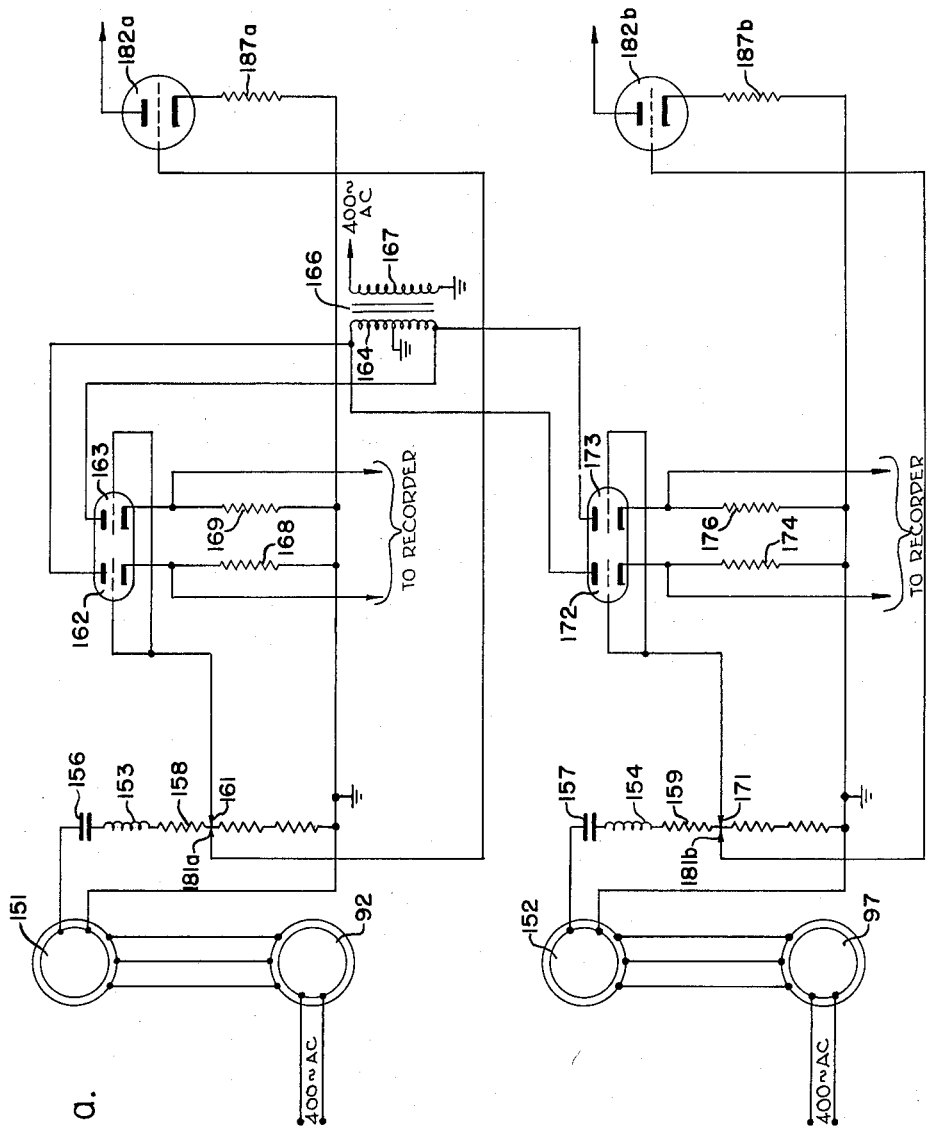

INVENTORS
ERICK O. SCHONSTEDT
HENRY R. IRONS

Feb. 14, 1956   E. O. SCHONSTEDT ET AL   2,735,063
TOTAL FIELD MAGNETOMETER
Filed Aug. 6, 1952   8 Sheets-Sheet 6
FIG.4.   FIG.6.
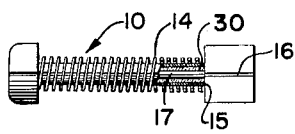
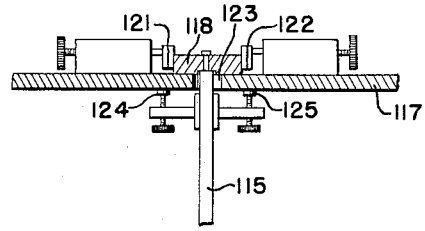
FIG.7.
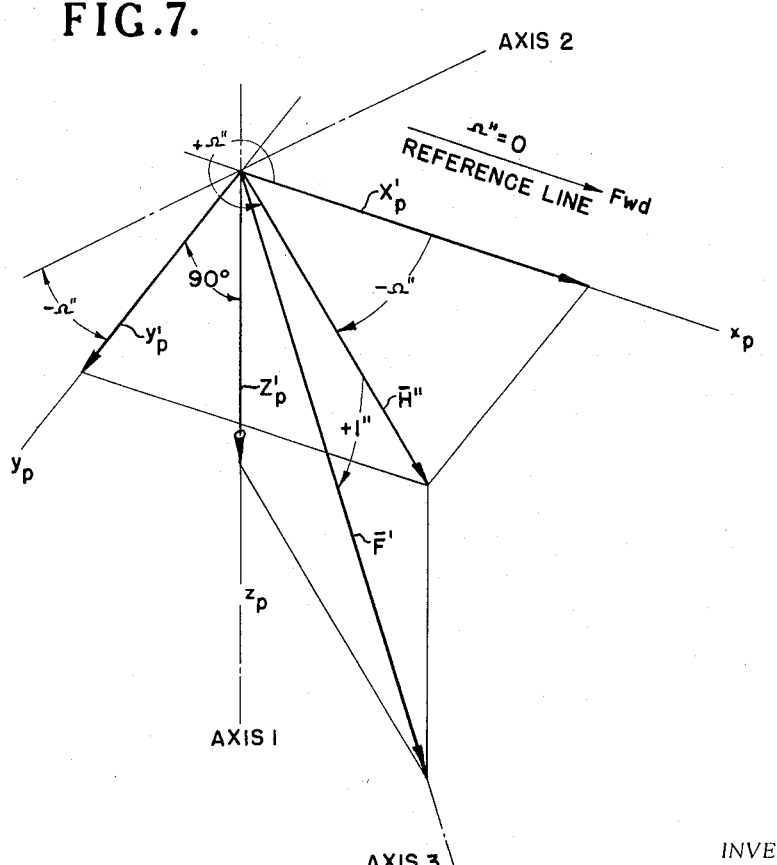
INVENTORS
ERICK O. SCHONSTEDT
HENRY R. IRONS
BY
ATTORNEYS

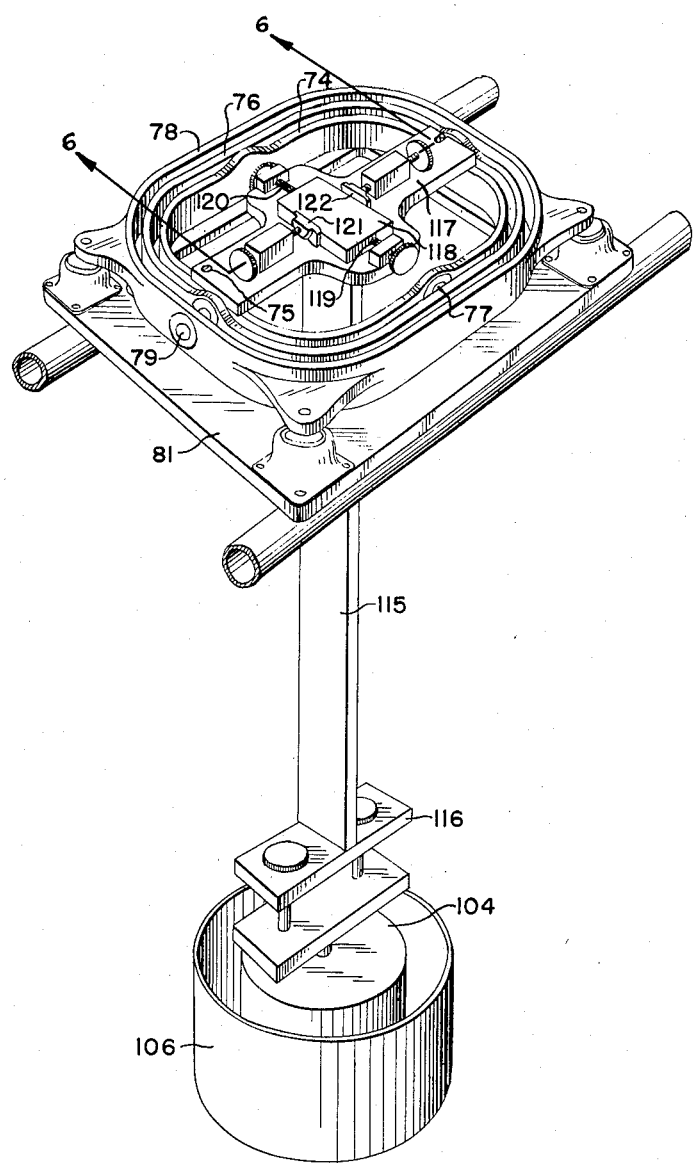

Feb. 14, 1956     E. O. SCHONSTEDT ET AL     2,735,063
TOTAL FIELD MAGNETOMETER

Filed Aug. 6, 1952     8 Sheets-Sheet 8

INVENTORS
ERICK O. SCHONSTEDT
HENRY R. IRONS

BY
ATTORNEYS

United States Patent Office

2,735,063
Patented Feb. 14, 1956

2,735,063

TOTAL FIELD MAGNETOMETER

Erick O. Schonstedt, Silver Spring, and Henry R. Irons, Takoma Park, Md., assignors to the United States of America as represented by the Secretary of the Navy Application August 6, 1952, Serial No. 303,017

9 Claims. (Cl. 324—43)

(Granted under Title 35, U. S. Code (1952), sec. 266)

The invention described herein may be manufactured and used by or for the Government of the United States of America for governmental purposes without the payment of any royalties thereon or therefor.

The present invention comprises novel and useful improvements in magnetometers and more particularly pertains to a magnetometer for continuously measuring the magnitude and direction of the earth's magnetic field vector from an aircraft.

Related prior art devices, such as that disclosed in the copending application of E. O. Schonstedt, for Method and Apparatus for Measuring the Earth's Magnetic Field Vector, Serial No. 187,653, now Patent No. 2,687,507, issued August 24, 1954, provide a gimbally suspended detector head composed of three mutually perpendicular inductors. Provision is made for causing the detector head to be oriented about two relatively perpendicular axes to a position such that the output signals from two of the inductors, hereinafter referred to as the azimuth and elevation inductors, due to earth's magnetic field vector, are zero. Since the inductors only detect that component of the magnetic field parallel to the axis thereof, the position of zero output signal is achieved when the inductors are perpendicular to the earth's magnetic vector. Under these conditions, the third inductor, hereinafter referred to as the total field inductor, is oriented parallel to the earth's field vector, and consequently the signal output thereof is correlative with the earth's total magnetic field vector. Provision is also made for recording the angle through which the detector head is rotated in azimuth and elevation.

In the aforementioned device, the outer ring of the gimbal which supports the detector head is fixedly mounted relative to the aircraft. It is consequently necessary to measure and record the variations of attitude of the aircraft from true vertical with respect to the earth so as to permit the subsequent calculation of the magnetic heading of the aircraft and the angle of dip of the earth's magnetic field vector. The angle of declination of the earth's magnetic field vector can then be determined from a knowledge of the true heading of the aircraft and the magnetic heading of the aircraft.

The present invention employs a detector head containing three mutually perpendicular saturable inductors. The azimuth and elevation inductors are employed with a servo system to align the total field inductor parallel with the earth's magnetic field vector, which total field inductor measures the intensity of the earth's magnetic field. The detector head is arranged in a gimbal such that the total field inductor can be oriented in azimuth and elevation, and synchro transmitters are geared to the axes about which the detector is oriented, which transmitters are employed for measuring the amount of angular rotation of the total field inductor about the gimbal axes from a predetermined zero position.

The gimbally mounted detector head is pendulously suspended, by means of a second gimbal, whereby the magnetometer provides its own vertical reference and the angular position of the azimuth and elevation inductors, with respect to true vertical, are directly detected by the synchro control transformers. Thus, the magnetometer of the present invention permits the continuous recording of the angle of dip, magnetic heading angle, and total intensity.

In order to eliminate the effects of aircraft acceleration on the pendulously suspended magnetometer, provision is made for averaging the measured angles of dip and magnetic heading over a predetermined interval of time determined by the roll and pitch oscillations of the aircraft. The oscillations about the pitch axis of the aircraft, known as phugoid oscillations, are of a periodic nature and consequently the average orientation of the pendulum axis in the pitch direction over one phugoid oscillation will provide a satisfactory measure of vertical in plane of pitch. The same is true for the oscillations in the plane or roll provided a correction is made for the deflection of the pendulum due to coriolis acceleration. In the present invention, the interval employed is the average time for two or more phugoid oscillations. If a single cycle of pitch motion were used for the interval, one could not be assured that an integral number of roll oscillations would be obtained during the interval and the error resulting may be undesirably large. By employing a time for two phugoid oscillations, the residual error due to not having an integral number of roll oscillations has been found to be acceptably small.

An important object of this invention is to provide an apparatus for continuously measuring and recording from an aircraft the earth's total magnetic field vector, the angle of dip of the earth's magnetic field, and the magnetic heading of the aircraft.

Another object of this invention is to provide a magnetometer which is pendulously suspended whereby the angle of dip of the earth's magnetic field and the magnetic heading of the aircraft can be directly measured with respect to true vertical.

Another object of this invention is to provide a pendulously suspended magnetometer which directly measures the angle of dip and magnetic heading of the aircraft, with means for compensating for the errors introduced to roll and pitch oscillations of the aircraft and coriolis acceleration.

Another object of this invention is to provide a pendulously suspended magnetometer which directly measures the angle of dip and magnetic heading of the aircraft with respect to the vertical established by the magnetometer, with means for averaging the measured angles over a time interval determined by the roll and pitch oscillations of the aircraft.

A further object of this invention is to compensate for errors due to drift in the angle averaging circuits, to thereby improve the accuracy of the angle measurements.

Yet another object of this invention is to provide a magnetometer which is adapted to measure the earth's magnetic field vector for angles of dip between zero degrees and 90°.

Other objects and many of the attendant advantages of this invention will be readily appreciated as the same becomes better understood by reference to the following detailed description when considered in connection with the accompanying drawings wherein:

Figs. 3a and 3b are schematic diagrams of the angle measuring an integrating circuits;

Fig. 4 is a side elevational view of the detector inductor, parts being broken away and illustrated in section to show details of construction;

Fig. 5 is a perspective view of the mounting bar assembly for supporting the magnetometer in a horizontally disposed position;

Fig. 6 is a fragmentary sectional view taken on the plane 6—6 of Fig. 5;

Fig. 7 is a vector diagram illustrating the components of the total magnetic field at the detector for the vertical mounting of the magnetometer;

Figure 2:
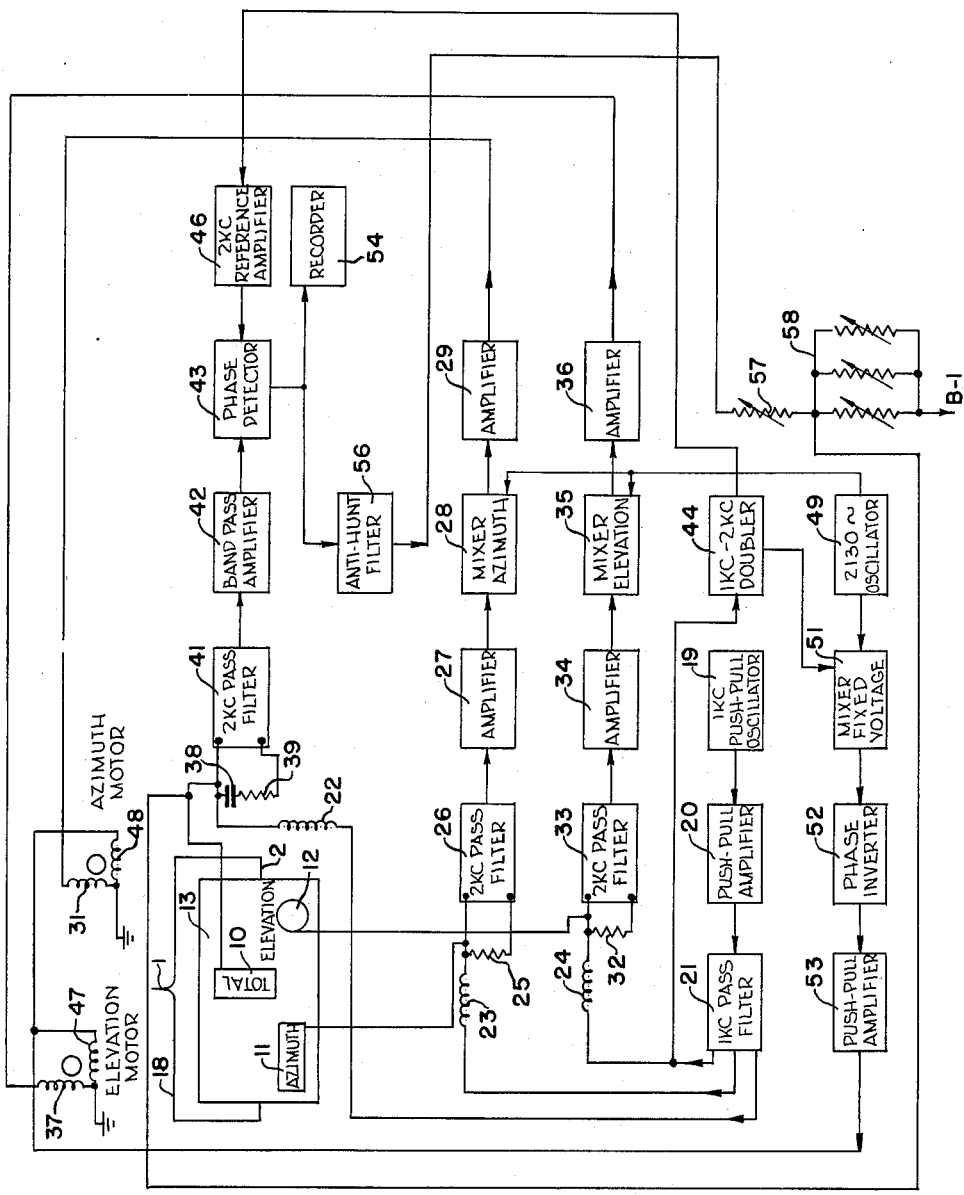
Fig. 2 is a block diagram of the circuitry for effecting automatic orientation of the magnetometer inductor elements, and for detecting and measuring the total magnetic field vector.

Reference is now made more specifically to Fig. 2 of the accompanying drawings.

The instant invention relates to a total field magnetometer of the type in which an inductor 10, hereinafter referred to as the total field inductor is continually oriented parallel to the magnetic field vector to be measured. For this purpose the total field inductor 10 is maintained perpendicular to a pair of relatively perpendicular inductors, hereinafter referred to as the azimuth inductor 11 and the elevation inductor 12. For convenience in maintaining the proper relation between the inductors, the latter may be mounted in a detector head such as 13.

Figure 1A:
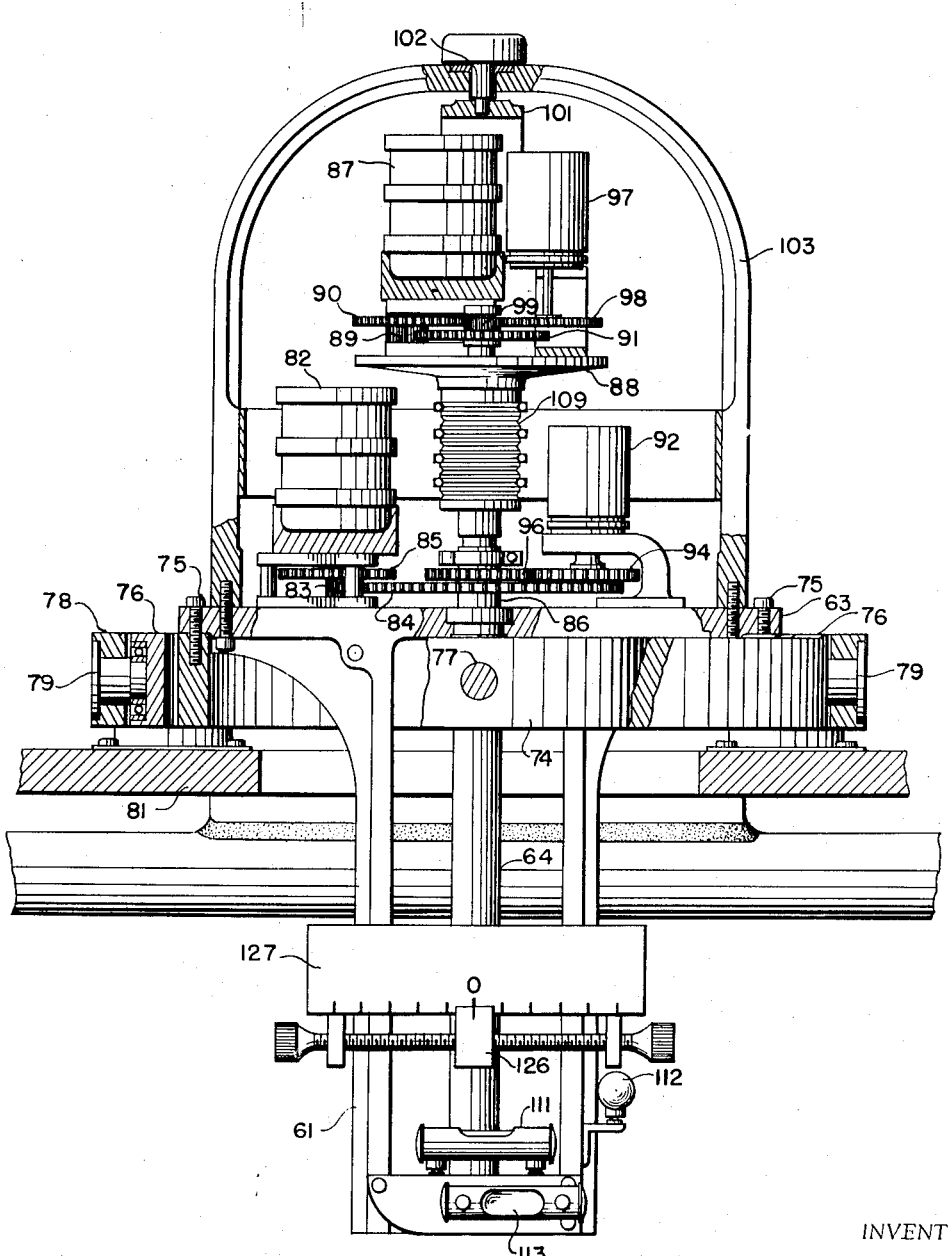
Figs. 1a and 1b are side elevational views of the magnetometer head mechanism, parts being broken away and shown in section to illustrate details of construction.
Figure 1B:
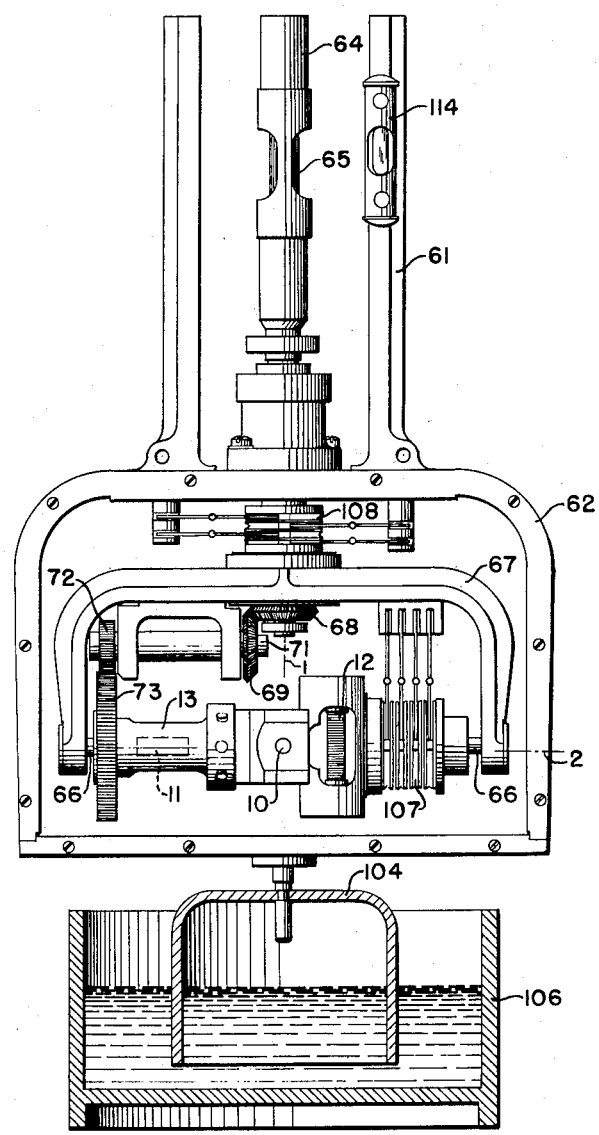

The detector head 13 is preferably formed of a nonmagnetic metal such as aluminum having a low coefficient of thermal expansion, the inductor elements being mounted in openings [see Fig. 1b] in the detector head, which openings are provided to reduce eddy currents. Since a field nulling current is passed through the total field inductor 10, the external field in the vicinity of the total field inductor is distorted. It is consequently necessary to symmetrically position the total field inductor relative to the axes of the azimuth and elevation inductors so that the external field, as distorted by the field nulling current, does not introduce spurious signals in the azimuth and elevation inductors.

The magnitude of the external field vector is thus determined by the field nulling current and the recorded residual field in the detector inductor. Since the magnitude of the field set up by the nulling current is a function of the inductor dimensions, the coil 14 [Fig. 4] of the detector inductor 10 is wound on a spool 15 formed of material having a low temperature coefficient such as titanium. The spool is preferably split longitudinally as at 16 to reduce eddy currents in the spool, and the core 17 is disposed within the bore in the spool and insulated therefrom as by sleeve 30. In this manner, the errors introduced due to variations in temperature on the spool dimensions is reduced, and the accuracy of the measurements of the total magnetic field vector improved.

The detector head 13, for reasons hereinafter more fully set forth, is mounted for movement about an axis 1 which is perpendicular to the magnetically sensitive axis of the azimuth inductor 11. The detector head 13 is also mounted for movement, as by the gimbal ring 18, about an axis 2 perpendicular to the axis 1 and to the elevation inductor 12.

As is well known in the art, when the saturable inductors 10—12 are energized from a suitable source of A. C. current of fundamental frequency, the A. C. flux set up thereby in the inductors is symmetrical in the absence of an external field parallel to the inductors, and the voltage appearing across the excitation windings under those conditions, is a signal of the fundamental frequency and odd harmonics thereof. However, in the presence of an external field parallel to the magnetically sensitive axes of the inductors, the A. C. flux set up in the inductors is rendered asymmetrical, and the voltage appearing across the excitation winding of the inductor is then a signal including even harmonics of the fundamental frequency, which even harmonics such as the second harmonic are correlative in magnitude and phase with the amplitude and sign of the component of the external field parallel to the magnetically sensitive axes of the inductors.

Excitation current for the inductors 10—12 is supplied by an oscillator 19 having a fundamental output frequency such as 1 kc., the output of which oscillator is applied through an amplifier 20 to a 1 kc. pass filter 21 to remove all harmonic components present. The total field inductor 10, the azimuth inductor 11 and the elevation inductor 12 are energized from the output of the filter 21 through inductors 22, 23, 24 respectfully, which inductances are provided to reduce the intercoupling between the inductors 10, 11 and 12. As hereinbefore set forth, the A. C. flux set up in the inductors 10—12 is rendered asymmetrical in the presence of an external field having a component parallel to the magnetic axes of the inductors, and a voltage drop across the excitation windings of the inductors contains even harmonic components under those conditions. The signals developed across the azimuth and elevation inductors 11 and 12 respectively are applied through separate similar channels to control the azimuth and elevation servomotors.

The servomotors are operatively associated with the detector head 13 so as to cause the latter to be moved about the axes 1 and 2 in a direction determined by the sign of the component of the magnetic field vector parallel to the respective azimuth and elevation inductors. The voltage appearing across the azimuth inductor 11 is applied across resistor 25 to the 2 kc. pass filter 26 which passes only the second harmonic of the exciting frequency, the output of which filter is applied to an amplifier 27, the amplified signal being applied to a mixer 28 which produces a signal at a reduced frequency such as 130 cycles, which reduced frequency signal is correlative in amplitude and phase with the second harmonic component of the signal applied to the filter 26. The reduced frequency signal is amplified in an amplifier 29 and applied to one of the field windings 31 of the azimuth servomotor. Similarly, the output of the elevation inductor 12 is applied across a resistor 32 to a 2 kc. pass filter 33, amplifier 34, mixer 35 and amplifier 36 to one of the field windings 37 of the elevation servomotor. Thus, whenever the detector head 13 is oriented such that there is a component of the magnetic field parallel to the magnetically sensitive axis of either the azimuth or elevation inductor 11 or 12, the azimuth and elevation servomotors are energized in amplitude and phase so as to cause the detector head 13 to be rotated about the azimuth and elevation axes 1 and 2 respectfully to a position such that the signals induced in the azimuth and elevation inductors by the magnetic field vector are zero. Under these conditions, both the azimuth and elevation inductors will be oriented perpendicular to the magnetic field vector, and consequently the total field inductor 10 will be oriented parallel to the magnetic field vector. The second harmonic component of the voltage developed across the total field inductor 10 is thus correlative with the total magnetic field vector, which second harmonic voltage is applied across the series RC circuit including condenser 38 and resistor 39 to a 2 kc. pass filter 41, the output of which is amplified in the band pass amplifier 42 and applied to a phase detector 43.

As is well known to those skilled in the art, the phase detector produces an output voltage correlative in amplitude and polarity with the relative phase of the signal to be detected and the reference signal, both of which signals are of the same frequency. This reference signal is provided from the oscillator 19 which energizes the inductors, the output of the filter 21 being applied to a frequency doubler 44, the output of which is applied through the reference amplifier 46 to the phase detector 43.

The windings 47 and 48, of the elevation and azimuth servomotors, respectively are excited with a 130 cycle voltage of constant amplitude and fixed phase. The 130 cycle voltages produced as a result of signals from the orienting inductors lead or lag this fixed phase voltage by 90° depending upon the direction of the field along the axis of the orienting inductors. The 130 cycle voltage of fixed phase is provided by mixing the 2 kc. signal from the doubler 44 with a 2130 cycle signal from an oscillator 49 in the mixer 51. As is apparent from Fig. 2, the output of the mixer is applied through the phase inverter 52 to a push-pull amplifier 53, the output of which is applied to the field windings 47 and 48.

The bulk of the earth's magnetic field in inductor 10, is nulled out by a direct current obtained from battery B-1 which passes through control resistors 58 to inductor 10. The output of the phase detector 43 is a D. C. voltage proportional to the second harmonic output of inductor 10 and is applied to recorder 54 which is calibrated to record this voltage in terms of variations of the total magnetic field intensity. A portion of the phase detector output current passes through the antihunt filter 56, the sensitivity control resistor 57, and the inductor 10. This current reduces the amplitude of the remainder of the earth's magnetic field in inductor 10 to very nearly zero.

By measuring the magnitude of the current fed to the inductor from B-1, the base value of the total magnetic field intensity, about which the variations are recorded, can be determined.

Reference is now made more specifically to the magnetometer assembly illustrated in Figs. 1a and 1b of the drawings. The head mechanism comprises an elongated support frame 61 having a bifurcated lower end 62 and an integral plate 63 extending transversely the upper end. Outer and inner coaxial shafts 64 and 65 are journalled in the frame, and extend longitudinally thereof, an outer gimbal yoke 67 being fixedly secured to the outer shaft for movement therewith between the legs of the bifurcated lower end of the frame. The hereinbefore mentioned detector head 13 having the relatively perpendicular total field inductor 10, azimuth inductor 11 and elevation inductor 12 mounted therein is journalled in the gimbal yoke 67 for movement about the axis of stub shafts 66 which axis is perpendicular to the axis of the shaft 64. The inner shaft 65 is drivingly engaged through a train of precision gears including bevel gears 68, 69, shaft 71 and spur gears 72 and 73 to thereby cause the detector head 13 to be rotated about the stub shafts 66 in response to rotation of the shaft 65 relative to the shaft 64. It is thus apparent that the detector head 13 can be caused to rotate about the axis 1, referred to as the azimuth axis, which axis is coaxial with the shaft 64, by rotating the shaft 64, and that the detector 13 can be caused to rotate about a relatively perpendicular axis 2, referred to as the elevation axis, in response to rotation of the shaft 65 relative to the shaft 64.

In order that the measurements of the angle of dip and magnetic heading made by the magnetometer will be with respect to true vertical, the support frame 61 is pendulously suspended. The support frame 61 is attached by means of pins 75 on a gimbal including the inner gimbal ring 74 which is journalled in the outer gimbal ring 76 for movement about the axis of stub shafts 77, the outer gimbal ring being journalled in a supporting ring 78 for movement about the axis of stub shafts 79, which axis is relatively perpendicular to the axis of stub shafts 77. The supporting ring 78 is secured, in any desired manner, to a mounting frame 81, which frame is adapted to be attached to the airplane or other vehicle which transports the magnetometer during the exploration.

The azimuth servomotor 82 which, as hereinbefore set forth, causes the detector head 13 to be oriented in such a manner that the azimuth inductor 11 is perpendicular to the earth's magnetic field vector, is mounted on the plate 63 on the end of the support frame 61 remote from the detector head, in any desired manner, and drivingly connected to the outer shaft 64 by a train of precision gears including the gears 84 and 85. The elevation servomotor 87 is mounted, as by the supporting flange 88 on the outer shaft 64, for movement therewith, the elevation servomotor being drivingly connected through gears 89, 90 and 91 to the inner shaft 65 so as to cause the inner shaft to rotate relative to the outer shaft in response to energization of the elevation servomotor 87.

Since the head mechanism is pendulously suspended and consequently provides its own vertical reference, the magnetic heading of the aircraft and the angle of dip, with respect to true vertical, can be directly detected by measuring the angles through which the detector head 13 has been rotated in azimuth and elevation from a predetermined position. The magnetic heading of the aircraft can be detected by measuring the angle through which the outer shaft 64 has been rotated, and the angle of dip can be detected by measuring the angle through which the inner shaft 65 has been rotated relative to the outer shaft. For this purpose an azimuth synchro transmitter 92, which is mounted in any desired manner on the support plate 63, is drivingly connected as by the gears 94 and 96 to the outer shaft 64, and the elevation synchro transmitter 97 which is fixedly mounted on the supporting flange 88 is drivingly connected to the inner shaft 65, as by gears 98 and 99.

A supporting yoke 101 is secured to the flange 88 and has the web portion thereof journalled as at 102 in the U shaped member 103 which is carried by the plate 63.

A baffle 104 is secured to the lower bifurcated end 62 of the support frame 61 to damp the oscillation of the pendulously suspended support frame, which baffle is disposed in a liquid containing receptacle 106 carried by the aircraft.

In order to provide for electrical connections between the inductors 10—12 and the support frame 61, slip ring assemblies 107 and 108 are employed, slip ring assembly 109 being employed to provide for electrical connections between the support frame and the elevation servo motor 87 and the elevation synchro transmitter 97. Levels 111 and 112 are mounted on the support frame 61 to facilitate level adjustment of the pendulously suspended magnetometer by means of weights (not shown) when in its vertically disposed position, and levels 113 and 114 are provided to facilitate leveling the magnetometer by means described more fully hereinafter when in its horizontally disposed position.

Motions of the detector gimbal, due to aircraft oscillations, are amplified to an excessive degree when the magnetometer head mechanism is operated in the vertically disposed position in an area in which the angle of dip of the earth's magnetic field lies between 75° and 90°. Excessive gimbal motion makes the angular orientations of the detector inductor about the gimbal axes difficult to determine accurately. In order to adapt the magnetometer for use with such high angles of dip, provision is made for attaching the mounting frame in a horizontally disposed position, so that the magnetometer head mechanism is gimbally suspended by the gimbal rings 76 and 74 in a horizontal position. Under these conditions, the angles detected by the azimuth and elevation synchro transmitters are correlative of the magnetic heading of the aircraft and the angle of dip, respectfully, and consequently the latter can be readily computed.

A mounting bar 115 is provided (see Figs. 5 and 6), to permit suspension of the magnetometer head mechanism in a horizontal position, which mounting bar is adapted to be detachably secured to the support frame 61, at the balance point of the head mechanism, as by clamp assembly 116, a transverse bar 117 being provided at one end of the mounting bar, which transverse bar is adapted to be secured as by the pins 75 to the inner gimbal ring 74.

As in the embodiment in which the magnetometer is disposed vertically, the baffle 104 is carried by the pendulously suspended mounting bar, the length of the bar being chosen such that the baffle 104 is adapted to extend into the liquid containing receptacle 106 also carried by the aircraft, when the mounting bar is suspended from the gimbal including the inner and outer rings 74 and 76.

To facilitate leveling of the magnetometer when in the horizontally disposed position, the mounting bar 115 is provided with a head 118 which is adapted to be clamped between the adjustable jaw members 119, 120, 121 and 122 on the transverse bar 117, the mounting bar extending through an opening 123 in the transverse bar which opening is sufficiently large to permit the aforementioned adjustment. Further, clamping screws 124 and 125 are provided on the mounting bar 115 and engage the transverse bar 117 to lock the mounting bar 115 in its adjusted position to the transverse bar 117.

In order to compensate for Coriolis acceleration, a weight 126 is adjustably mounted on the support frame 61, which weight can be adjusted to compensate for the Coriolis acceleration for the geographical location of the aircraft, suitably calibrated indicia on scale 127 being provided on the Coriolis corrector to facilitate proper adjustment of the weight. The magnitude of the correction can be obtained from tables of the American Air Almanac.

Figure 3B:
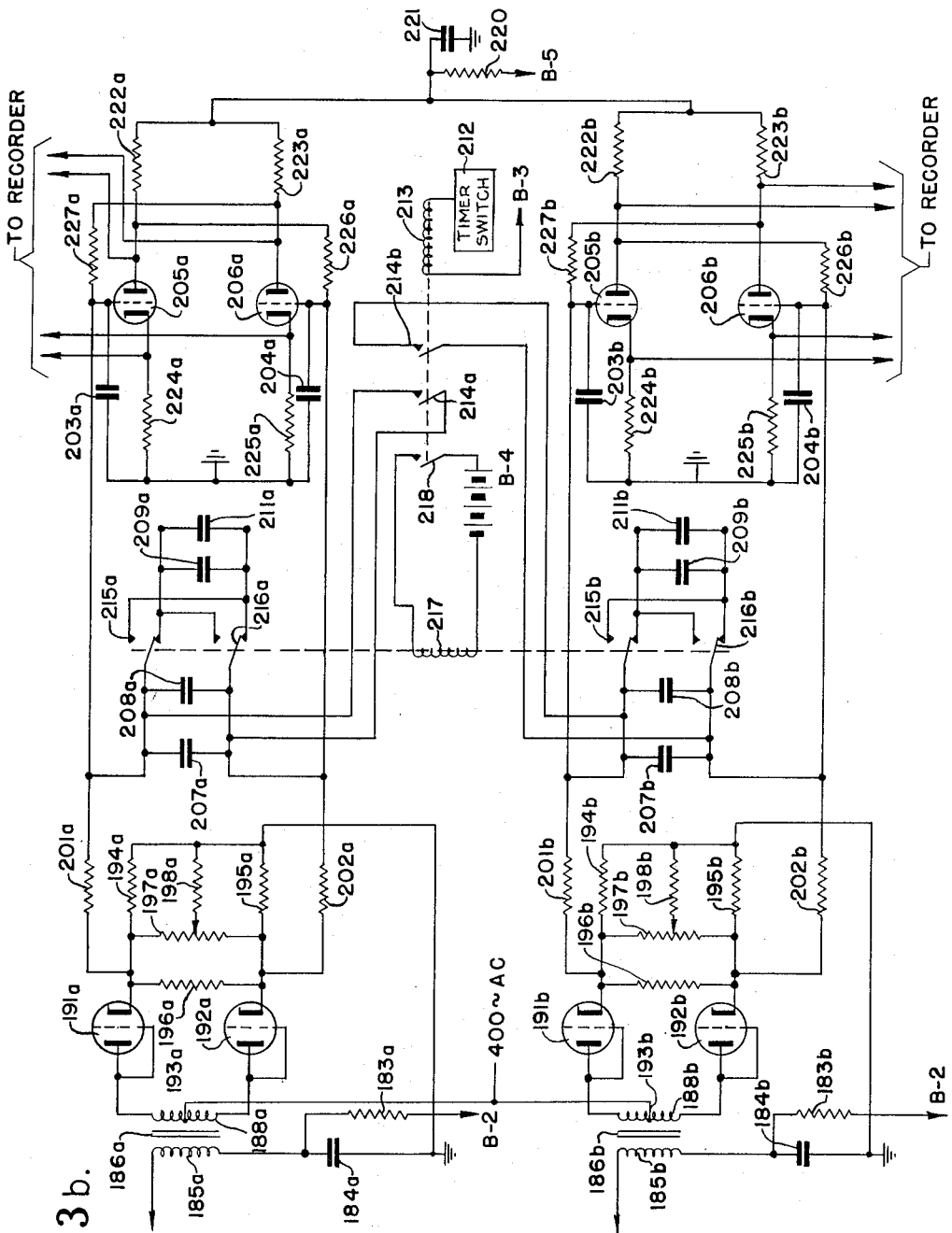

Reference is now made more specifically to Figs. 3a and 3b of the drawings wherein there is illustrated a schematic diagram of the azimuth and elevation angle measuring circuit. The azimuth and elevation synchro transmitters, 92 and 97 respectively are electrically connected to the azimuth control transformer 151 and the elevation control transformer 152 so as to produce an output signal from the respective control transformers, correlative in amplitude and phase with the angular differences between the settings of the rotors of the respective synchro transmitters and control transformers. The error voltages from the azimuth and elevation control transformers are respectively applied through series LC circuits comprising inductors 153 and 154 and capacitors 156 and 157, which LC circuits are chosen so as to be resonant at frequencies of the fundamental of the A. C. synchro transmitter supply voltage. The output of the filter associated with the azimuth control transformer is applied to a potentiometer composed of a series of resistors wired to the switches, the wiper 158 of one switch is connected to a phase detector amplifier which is connected to a recorder so as to produce a time record of the instantaneous angular difference between the rotor settings of the control transformer and the azimuth synchro transmitter, the wiper of the other switch being connected to the aforementioned integrator, which integrator is also associated with a recorder so as to produce a time record of the integrated angular difference between the azimuth control transformer and the azimuth synchro transmitter. Similarly, the output of the filter associated with the elevation control transformer is applied to a potentiometer 159 having dual wipers, one of which is connected to a phase detector amplifier and the other of which is connected to an integrator.

More specifically, the wiper 161 on potentiometer 158 is connected to the grids of triodes 162 and 163, the plates of which triodes of energized in push-pull from the secondary 164 of transformer 166. The primary 167 of the transformer 166 is energized with an A. C. voltage, of the same frequency and phase as that applied to the synchro transmitters. The cathodes of triodes 162 and 163 are coupled to load resistors 168 and 169 to ground, the output taken off the cathodes and applied to a recorder. As is apparent, in the absence of the signal applied to the grids of tubes 162 and 163, the voltage drops across resistors 168 and 169 will be equal, and the output of the phase detector is consequently zero under those conditions. However, when an error voltage is applied to the grids of tubes 162 and 163, the voltage will be in phase with the plate potential on one of the tubes and in phase opposition with the plate potential of the other of the tubes and consequently the potential drops across resistors 168 and 169 will differ in magnitude dependent upon the amplitude and phase relationship between the grid and plate potentials. Thus when the grid potential and the plate potential of tube 162 are in phase with each other, the grid potential and the plate potential in tube 163 are in phase opposition, and the drop across resistor 168 will be increased while the drop across resistor 169 is decreased. The difference voltage appearing across the cathodes of the tubes 162 and 163 is thus correlative in amplitude and polarity with the magnitude and phase of the error voltage from the synchro control transformer. Similarly, the tap 171 on potentiometer 159 is connected to the grid of triodes 172 and 173 in the elevation phase detector, the plates of which triodes are connected to the secondary 164 of the transformer 166. The cathodes of 172 and 173 are connected to ground by resistors 174 and 176 respectively, and the difference voltage appearing across the cathodes is applied to a recorder, which difference voltage is also correlative in magnitude and polarity with the amplitude and phase of the elevation error signal.

As hereinbefore mentioned, the error voltage from the output of the synchro transformers are also applied to integrating circuits which integrate the error voltage over a predetermined time interval, determined by the duration of the roll and pitch oscillations of the aircraft. Since the integrating circuits for the azimuth and elevation error voltages are similar, like numerals will designate the same parts in the separate channels, the components in the azimuth channels being designated by the subscript "a" after the numeral, and the components in the elevation channel being designated by the subscript "b" after the numeral. For brevity, only one channel will be described, it being understood that the description is applicable to both channels and the described components are indicated on the drawings with the appropriate subscript "a" or "b" denoting respectively the azimuth and elevation channels.

The error voltage from the synchro transformers appearing across the potentiometer is applied through the tap 181 on the potentiometer to the grid of the amplifier tube 182. Plate potential for tube 182 is applied from source $B_2$ through the decoupling circuit including the resistor 183 and capacitor 184, through the plate load comprising primary winding 185 of transformer 186. As is conventional, grid bias is provided by the cathode resistor 187.

The output of the amplifier stage appearing across the secondary 188 of the transformer 186 is applied to a phase-sensitive detector including tubes 191 and 192, an A. C. reference voltage of the same frequency as the error signal from the synchro control transformer being applied to a center tap 193 on the secondary 188, whereby the tubes 191 and 192 are rendered conducting during one half cycle of the reference voltage. In the absence of an error signal from the synchro control transformer, the output voltages appearing across resistors 194 and 195 are equal, and consequently there is no difference voltage appearing across resistor 196. However, in the presence of an error voltage from the synchro control transformer, conduction through one of the tubes increased while conduction through the other of the tubes decreased and a difference voltage appears across resistor 196, of an amplitude and polarity correlative with the magnitude and phase of the error voltage relative to the applied voltage. Potentiometer 197 and resistor 198 are provided to permit balancing of the output of the tubes 191 and 192, in the absence of an error voltage from the synchro control transformer. The half wave pulse outputs from tubes 191 and 192, appearing across resistors 194 and 195 respectively, are applied through R-C smoothing filters including resistors 201 and 202, and condensers 203 and 204, to the grids of amplifier tubes 205 and 206 respectively. Additionally, the voltages appearing across resistors 194 and 195 are applied to an integrating circuit which is balanced to ground, which integrating circuit includes resistors 201 and 202 and the condensers 207, 208, 209 and 211.

It has been ascertained that the pendulum oscillates in space in the roll and pitch directions at the frequencies and amplitudes of the roll and pitch motions of the aircraft. In cruising flight in smooth air, the pendulum motions are centered about a substantially vertical line. The average orientation of the pendulum axis in the pitch direction over one phugoid oscillation during such flight will provide a satisfactory measure of vertical in plane of pitch. The same is true for the oscillations in the plane of roll provided a correction is made for the deflection of the pendulum due to Coriolis acceleration. The magnetometer's vertical, therefore, is determined by averaging the orientation of the pendulum axis over a suitable interval of flight.

The interval employed is the average time for two phugoid oscillations. If a single cycle of a pitch motion is used for the interval, one cannot be assured that an integral number of roll oscillations would be attained during the interval and the error resulting may be undesirably large. By employing the time for two phugoid oscillations, the residual error due to not having an integral number of roll oscillations has been found to be acceptably small. In practice, a fixed interval length of about 1½ minutes determined by the characteristics of the airplane is used and no attempt is made to select periods in which precisely two cycles occur. This makes the process of analyzing the data simpler and more practical since actually the aircraft oscillations during smooth flight are not very regular.

Integration of the output of the phase detector is achieved in the aformentioned integrating circuit, a timer switch 212 being provided to selectively actuate the relay solenoid 213 which is energized from battery B₃ to thereby close the switch 214 which effects shorting of the integrating condensers 207, 208, 209 and 211 at the end of the integrating interval. It has been ascertained, however, that shorting of the integrating condensers does not completely discharge the latter, and consequently provision is made for reversing the connections between the condensers 209 and 211 and the condensers 207 and 208. In this manner, the residual charges on the condensers are caused to cancel out. Reversal of the connections between condensers 209, 211 and condensers 207, 208 is effected by reversing switches 215 and 216, which switches are actuated by solenoid 217. Solenoid 217 is energized from battery B₄ through switch 218, which last mentioned switch is periodically closed by the timer switch controlled solenoid 213. In this manner, each time the integrating condensers are shorted, the connections between pairs of the condensers are reversed so that the residual charges remaining thereon tend to cancel each other. Thus, "drifting" in the integrating circuit is prevented.

The instantaneous voltages applied to the grids of tubes 205 and 206 are thus the time integral of the voltage appearing across resistors 194 and 195 respectively, which last mentioned voltages are respectively correlative in amplitude and polarity with the amplitude and phase of the error voltages from the synchro transformers. The peak amplitude of the grid potential on tubes 205 and 206, at the end of the interval determined by timer controlled switch 212 is thus a measure of the total time integral over the interval determined by the timer switch 212, of the difference between the control transformer setting and the instantaneous rotor position in the synchro transmitter. Since the interval of the timer switch 212 is chosen such that it is approximately equal to the period of one or more phugoid oscillations of the aircraft, the time integral thereof over the aforementioned period is correlative with the average angular deviation between the elevation synchro control transformer and the elevation synchro transmitter.

The signals appearing upon the grids of tubes 205 and 206 are amplified and applied to a recorder. Plate potential for 205 and 206 is applied from plate supply source B₅ through the decoupling circuit comprising resistor 220 and capacitor 221, and load resistors 222 and 223 to the plates of tubes 205 and 206 respectively, grid bias being provided by cathode resistors 224 and 225. The output of the tubes 205 and 206 is applied to a suitable recorder, which produces a time record thereof.

In order to reduce the error due to leaking off of the charge on the integrating condensers 207, 208, 209 and 211, during the integrating interval, provision is made for applying regenerative feedback so as to compensate for the leakage. This is achieved by applying a signal from the plate of each of the push-pull operated tubes 205 and 206 through resistors 226 and 227, respectively, to the grid of the opposite tube.

When the magnetometer is operated in its vertically disposed position illustrated in Figs. 1a and 1b, that is when the axis 1 about which the magnetometer rotates is disposed parallel to the vertical established by the pendulously suspended magnetometer, the detector head is oriented in its zero position when the magnetically sensitive axes of the azimuth and elevation inductors are disposed perpendicular to the direction of flight of the aircraft and the total field inductor is aligned parallel with the direction of flight of the aircraft. Thus, when the detector head is disposed in its zero position, the axis 1, or azimuth axis, about which the azimuth inductor rotates and the axis numeral 2, or elevation axis, about which the elevation inductor rotates are disposed in a plane perpendicular to the direction of flight of the aircraft.

The angular orientation of the total field inductor about the vertical axis, axis 1, is designated by the angle $\Omega''$ and the angular orientation of the total field inductor of the horizontal axis, axis 2, is designated angle $I''$ where the double primed $['']$ expressions denote those quantities which are affected both by coriolis acceleration and the magnetic field of the aircraft. Angle $\Omega''$ is zero when the horizontal component of the earth's magnetic field is parallel to the center line of the aircraft and has the same direction as the aircraft heading. Angle $I''$ is zero when the total field inductor axis is perpendicular to axis 1.

Referring to Fig. 7, the positions of axes 1, 2 and the total field inductor axis 3, when the angles $\Omega''$ and $I''$ are zero, form the rectangular coordinate system illustrated in Fig. 6. Coordinate $z_p$ is parallel with axis 1, coordinate $y_p$ is perpendicular to axis 1 and the aircraft centerline, and coordinate $x_p$ is perpendicular to $z_p$ and $y_p$. In order to conform with geomagnetic convention in which the downwardly directed vertical component of the earth's magnetic field is considered to be positive, $z_p$ is designated to be positive in the downward direction. Coordinate $x_p$ is positive in the horizontal direction of flight and coordinate $y_p$ is positive toward the starboard side of the aircraft so as to form a right hand coordinate system.

Angle $\Omega''$ is measured positive in the clockwise direction [as viewed from a point on the positive side of coordinate $z_p$] from $x_p$ to $\overline{H}''$, $\overline{H}''$ being the projection of the total magnetic field vector $\overline{F}'$ on the $x_p$—$y_p$ plane as shown on Fig. 7 where the single primed $[']$ expressions are those affected by the aircraft magnetic fields but not by coriolis acceleration. Angle $I''$, formed by $\overline{H}''$ and axis 3, is positive with the vertical component of the resultant magnetic field [earth's field plus the aircraft field] is directed downwardly and negative when directed upwardly. Under the above conditions, the components of the resultant magnetic field measured with respect to the pendulous coordinate system will be:

[1] $X'_p = F' \cos I'' \cos \Omega''$
[2] $Y'_p = -F' \cos I'' \sin \Omega''$
[3] $Z'_p = F' \sin I''$ where $F'$ is the resultant intensity of the earth's aircraft magnetic field.

Figure 8:
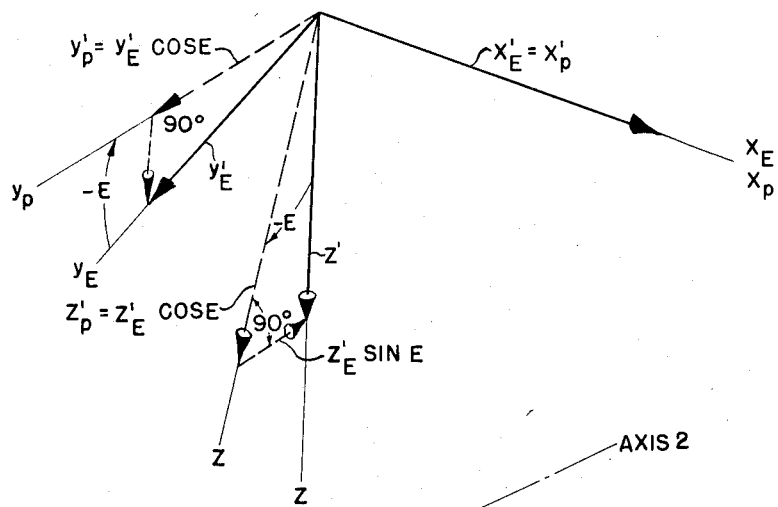
Fig. 8 is a vector diagram illustrating the displacement of the coordinate system due to coriolis force.

Due to coriolis acceleration, $z_p$ will not be exactly vertical and the $x_p$—$y_p$ plane will not be horizontal. An error is therefore introduced into the computations of the vertical and horizontal components of the magnetic field, $F'$, unless a correction is made for the angular deflection of the pendulum due to the force resulting from this acceleration. In Fig. 8 the pendulous coordinate system is shown to be deflected through an angle E due to the coriolis force. Coordinates $x_e$, $y_e$, and $z_e$ are the positions respectively which $x_p$, $y_p$, and $z_p$ would occupy if this force were not present. The deflection, E, takes place in a plane perpendicular to the direction of flight and is a clockwise angle for flights in a northern hemisphere and a counterclockwise angle in the southern hemisphere. In Fig. 8, E is clockwise.

It can be shown that the variation of the angle $\Omega''$ in terms of $I''$ and $\Omega''$ with E is given by the following expression:

[4] $\Delta\Omega'' \cong E \tan I'' \cos \Omega''$ where $\Delta\Omega''$ is the change in $\Omega''$ due to E for a given value of $I'$ and $\Omega'$.

It can further be shown that $I''$ varies as a function of E, which relationship is given by the following equation:

[5] $\Delta I'' = -E \sin \Omega''$ where $\Delta I''$ is the change in $I''$ due to E.

Figure 9:
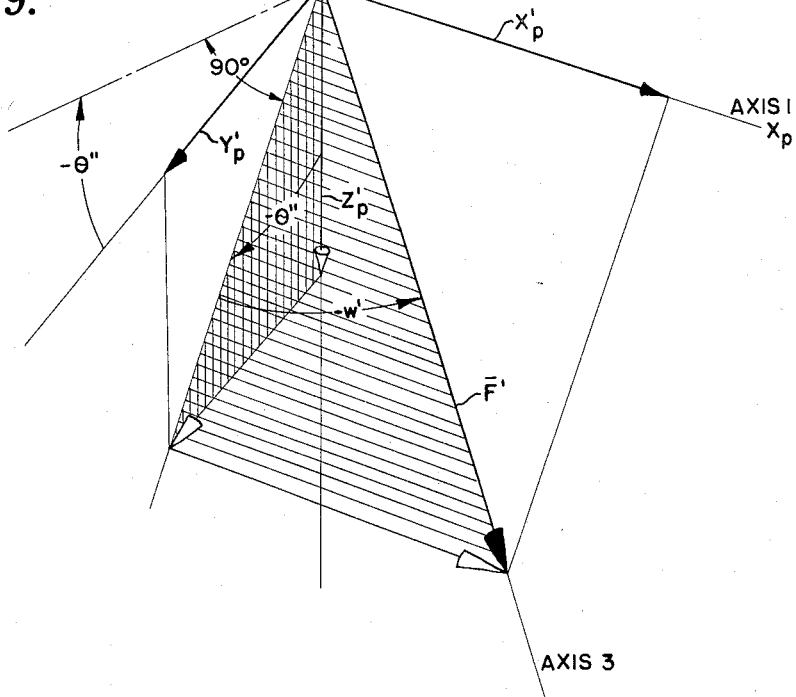
Fig. 9 is a vector diagram illustrating the components of the total magnetic field at the detector for the horizontal mounting of the magnetometer.

In the horizontal suspension, the mechanism has been rotated through 90° from its vertical mounting and, as shown in Fig. 9, axis 1 now becomes the $x_p$ coordinate and the pendulum axis the $z_p$ coordinate, coordinate $y_p$ being perpendicular to $x_p$ and $z_p$ as before.

The angular orientation of the detector about axis 1 when the mechanism is in the horizontal position, is referred to as the angle $\theta''$. The angular orientation of the detector about axis 2 is the $\omega'$. Angle $\theta''$ is zero when axis 3 of the total field inductor is parallel with the pendulum vertical $z_p$ and oriented for a vertical field in the northern hemisphere. Angle $\omega'$ is zero when axis 3 of the detector is perpendicular to axis 1, and oriented for a vertical field in the northern hemisphere. In the apparatus in which the various angles are measured, the channel that is used for measuring the angle $\Omega''$ is used to measure $\theta''$, and the channel that is used to measure $I''$ is used to measure $\omega'$. Fig. 9 illustrates the components obtained with respect to the $x_p$, $y_p$ and $z_p$ for the horizontal suspension. These components are:

[6] $X'_p = -F' \sin \omega'$
[7] $Y'_p = -F' \cos \omega' \sin \theta''$
[8] $Z_p = F' \cos \omega' \cos \theta''$ It should be noted that in Fig. 9 the angle $\theta''$ is considered negative for clockwise rotation. Similarly, the polarity of $\omega'$ is also considered positive for clockwise rotation and because the angle E lies in the same plane in which $\theta''$ has been measured, E is considered negative also for clockwise rotation.

It can be shown that when the magnetometer is suspended in the horizontal position, that the angle $\omega'$ is not a function of E so no correction for displacement due to coriolis force is necessary to be made on the angle $\omega'$. It can further be shown that when E is small, $\Delta\theta'' = -E$.

Since the correction for coriolis force with the vertical suspension in the magnetometer involved $Z''$ or $I''$ and $Z''$, it is involved to apply the correction. Consequently a movable weight is mounted on the mechanism so that the deflection due to coriolis acceleration can be eliminated by properly locating the weight. However, correction to the data obtained with the horizontal suspension is so simple that the mechanical corrector does not appear necessary.

As is well known in the art, the field of the aircraft can be compensated by passing a current through three sets of mutually perpendicular coils [not shown] mounted about the detector inductor, and the induced magnetism of the aircraft can be compensated by placing various suitable shapes and sizes of permeable material in the vicinity of the magnetometer detector mechanism. These materials create fields which oppose those of the aircraft.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A magnetometer for measuring the earth's magnetic field vector comprising a detector head, said detector head including first, second and third magnetic field detector elements having the magnetic axes thereof disposed in mutually perpendicular arrangement, means mounting said detector head for movement about first and second relatively perpendicular axes respectively perpendicular to the magnetic axes of said first and second detector elements, means for supporting said detector head on an aircraft and for maintaining said first axis in substantially true vertical with respect to the earth while the aircraft is in flight, means responsive to a component of the earth's magnetic field vector parallel to the magnetic axes of said first and second detector elements for causing said detector head to be rotated about said first and second axes to a position such that the magnetic axes of said first and second inductors are perpendicular to the earth's magnetic field vector, means for measuring the field detected by the third of said inductors, and means for measuring the angles through which said detector head is rotated about said first and second axes.

2. A magnetometer for measuring the earth's magnetic field vector from an aircraft comprising an elongated support frame, means including a gimbal for pendulously suspending said support frame, a detector head including first, second and third inductors having the magnetic axes thereof disposed in mutually perpendicular arrangement, means mounting said detector head on said support frame for movement relative thereto about first and second relatively perpendicular axes each perpendicular to the magnetic axes of said first and second detector elements, means responsive to a component of the earth's magnetic field vector parallel to the magnetic axes of said first and second detector elements for causing said detector head to be rotated about said first and second axes to a position such that the magnetic axes of said first and second elements are perpendicular to the earth's magnetic field vector, means for measuring the earth's magnetic field vector detected by said third element, and means for measuring the angle through which said detector head is rotated about said first and second axes from a predetermined position.

3. The combination of claim 2 wherein said last named measuring means includes means for averaging the angle measurements over an interval determined by the roll and pitch oscillations of the aircraft.

4. A magnetometer for measuring the earth's magnetic field vector from an aircraft comprising an elongated support frame, means including a gimbal for pendulously suspending said support frame, a detector head including first, second and third inductors having the magnetic axes thereof disposed in mutually perpendicular arrangement, means mounting said detector head on said support frame for movement relative thereto about first and second relatively perpendicular axes each perpendicular to the magnetic axes of said first and second detector elements, means responsive to a component of the earth's magnetic field vector parallel to the magnetic axes of said first and second detector elements for causing said detector head to be rotated about said first and second axes to a position such that the magnetic axes of said first and second elements are perpendicular to the earth's magnetic field vector, means for measuring the earth's magnetic field vector detected by said third element, means for producing signals having amplitude and polarity characteristics correlative with the angle through which said detector head is rotated about said first and second axes from a predetermined position, and means for integrating said signals over a predetermined time interval determined by the roll and pitch oscillations of the aircraft.

5. A magnetometer for measuring the earth's magnetic field vector comprising an elongated support frame, inner and outer coaxial shafts journaled in said frame and extending longitudinally thereof, means including a gimbal for pendulously suspending said support frame, a detector head including three magnetic field detecting elements having relatively perpendicular magnetically sensitive axes, means for mounting said detector head on said coaxial shafts adjacent one end of said frame for movement about either of two relatively perpendicular axes selectively in response to rotation of said inner and outer shafts, means including a servomotor on the other end of said frame for rotating one of said shafts in a direction correlative with the sign of the magnetic field detected by one of said elements, means including a servomotor mounted on the end of said last mentioned shaft for movement therewith for effecting relative rotation of said inner and outer shafts in response to a magnetic field detected by another of said elements, and means for measuring the magnetic field detected by the third of said elements.

6. The combination of claim 5 including means for measuring the angle from a predetermined position through which said outer shaft is rotated relative to said frame and means for measuring the angle from a predetermined position through said inner shaft is rotated relative to said outer shaft.

7. The combination of claim 6 including means for averaging the measured angles over a predetermined time interval.

8. A magnetometer for measuring the earth's magnetic field vector from an aircraft comprising a pendulously suspended support, a detector head including three magnetic field detecting elements having relatively perpendicular magnetically sensitive axes, means mounting said detector head on said support for movement relative thereto about two relatively perpendicular pivot axes, means responsive to a component of the earth's magnetic field vector parallel to the magnetically sensitive axes of either of a pair of said elements for causing said detector head to be rotated about either of said pair of pivot axes to a position such that the magnetically sensitive axes of said pair of elements are each disposed perpendicular to the earth's magnetic field vector, means for producing electrical signals correlative in amplitude and phase with the angle through which said detector head is rotated from a predetermined position about either of said pivot axes, means including a phase detector for producing a voltage output balanced to ground of an amplitude and polarity correlative with the amplitude and phase of said signal, integrating means including a plurality of electrically connected capacitors for averaging said output voltage, means for periodically shorting said capacitors and for reversing the connections between said capacitors to nullify the charges thereon, and means for measuring the averaged output voltage.

9. The combination of claim 8 wherein said integrating means includes a push-pull amplifier stage controlled by the averaged output voltage, and means including said push-pull amplifier stage for applying regenerative feedback to compensate for leakage from said condensers during the integrating intervals.

References Cited in the file of this patent

UNITED STATES PATENTS

| Re. 23,397 | Felch et al. | Aug. 7, 1951 |
| 1,988,521 | Sperry et al. | Jan. 22, 1935 |
| 2,357,319 | Esval et al. | Sept. 5, 1944 |
| 2,468,554 | Hull | Apr. 26, 1949 |
| 2,518,513 | Wyckoff | Aug. 15, 1950 |
| 2,556,199 | Lee | June 12, 1951 |
| 2,584,571 | Frowe | Feb. 5, 1952 |
| 2,659,859 | Heiland | Nov. 17, 1953 |